(12) United States Patent
De Villiers

(10) Patent No.: US 8,397,669 B2
(45) Date of Patent: Mar. 19, 2013

(54) METHOD AND ARRANGEMENT FOR ANIMAL MANAGEMENT

(75) Inventor: Pierre De Villiers, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 94 days.

(21) Appl. No.: 13/059,418

(22) PCT Filed: Jul. 29, 2009

(86) PCT No.: PCT/EP2009/059801
§ 371 (c)(1),
(2), (4) Date: Feb. 17, 2011

(87) PCT Pub. No.: WO2010/023056
PCT Pub. Date: Mar. 4, 2010

(65) Prior Publication Data
US 2011/0155064 A1 Jun. 30, 2011

(30) Foreign Application Priority Data
Aug. 29, 2008 (SE) .................................... 0801864-0

(51) Int. Cl.
*A01J 5/007* (2006.01)
(52) U.S. Cl. .................................. 119/14.02; 119/14.08
(58) Field of Classification Search ............... 119/14.02, 119/14.01, 14.03, 14.04, 14.08, 14.14, 14.18, 119/840
See application file for complete search history.

(56) References Cited

U.S. PATENT DOCUMENTS

| 4,006,714 A | 2/1977 | Goossen |
| 5,771,837 A | 6/1998 | Van der Lely |
| 6,062,165 A | 5/2000 | Sieling |
| 2002/0124803 A1 * | 9/2002 | Chen et al. ............... 119/14.08 |
| 2004/0244696 A1 * | 12/2004 | Woolford et al. ......... 119/14.03 |
| 2008/0270173 A1 * | 10/2008 | Pratt .......................... 705/1 |
| 2008/0282985 A1 * | 11/2008 | Schulte ..................... 119/14.02 |

(Continued)

FOREIGN PATENT DOCUMENTS

| EP | 0 582 350 A1 | 2/1994 |
| EP | 0 622 019 A1 | 11/1994 |

(Continued)

OTHER PUBLICATIONS

International Search Report, dated Jan. 26, 2010, from corresponding PCT application.

(Continued)

*Primary Examiner* — T. Nguyen
(74) *Attorney, Agent, or Firm* — Young & Thompson

(57) ABSTRACT

A method for management of animals in an area (11) including a plurality of grazing paddocks (12*a-f*), in which the animals graze, and a milking area (13), in which the animals are milked, wherein the milking area is accessible from each of the grazing paddocks and each of the grazing paddocks is accessible from the milking area via a sorting gate arrangement (17*a*, 17*c*). According to the method, each of a plurality of animals which have grazed in the grazing paddocks is identified (21) and milked (22) in the milking area. A nutritional need and/or a milk production capacity of each of the animals which have been identified and milked is/are established (23). Finally, each of the animals is automatically guided (24) by the sorting gate arrangement, subsequent to the milking of the animal, to enter a selected one of the grazing paddocks depending on the nutritional need and/or the milk production capacity of the animal.

25 Claims, 2 Drawing Sheets

U.S. PATENT DOCUMENTS

2009/0288605 A1* 11/2009 De Villiers ................ 119/14.02
2010/0180824 A1* 7/2010 Bright et al. ............... 119/14.08
2010/0192860 A1* 8/2010 Van Hoven ............... 119/14.02

FOREIGN PATENT DOCUMENTS

| FR | 2 776 891 A1 | 10/1999 |
|---|---|---|
| RU | 2 210 886 C2 | 8/2003 |
| RU | 2 278 501 C2 | 6/2006 |
| SU | 1 727 732 A1 | 4/1992 |
| SU | 1 777 728 A1 | 11/1992 |
| WO | 03/000044 A1 | 1/2003 |

OTHER PUBLICATIONS

Supplementary International Search Report, dated Dec. 9, 2010, from corresponding PCT application.

* cited by examiner

METHOD AND ARRANGEMENT FOR ANIMAL MANAGEMENT

TECHNICAL FIELD OF THE INVENTION

The present invention relates to a method and an arrangement for animal management in a milking system.

DESCRIPTION OF RELATED ART AND BACKGROUND OF THE INVENTION

Automatic milking systems (AMS) are well known in the art. The current implementations of AMS are almost entirely with cows held indoors. Cows are bedded and fed in a large barn that also houses the AMS. Cows learn to circulate freely the short distance between their cubicles and the AMS unit, a prime motivator being in-bail feeding while they are being milked in the AMS. The cows only need to move comparatively short distances, perhaps 20-30 m within the housing system to the AMS.

Many cows around the world are not housed in this fashion, however, but freely graze pasture. In New Zealand and Australia, in particular, there is no housing of cows; they spend all their time on pasture. These pasture-based systems are very extensive and often require the cows to walk considerable distances to be milked in conventional milking systems. This can be up to 2-3 km walking distance, and they normally do this twice a day. Voluntary milking systems, which cows visit on a voluntary basis, have become increasingly common during the last years. In such systems cows are monitored and are given milking permission on an individual basis.

WO 03/000044 discloses a selection system for milking animals which could enable an automatic milking system (AMS) to be efficiently used in extensive grazing husbandry. Lactating animals, for example cows, are attracted to a drinking station from a grazing paddock. As cows come to drink at the drinking station, they are identified and checked against milking records. If a cow meets a predefined criterion, it is directed to a milking area which could include an automatic milking system. If a cow does not meet a predetermined criterion, the cow is directed back to the paddock from where it came.

SUMMARY OF THE INVENTION

While WO 03/000044 discloses a system that indeed will increase the throughput of animals through the AMS and thus increase milk production, there are many more measures to be taken in order to increase productivity as well as animal welfare.

There is thus an object of the invention to provide a method and arrangement for animal management in a pasture based system, which provide for improved efficiency of the milking production.

This object, among others, is according to the present invention attained by methods and arrangements as specified in the appended patent claims.

According to a first aspect of the invention a method is provided for management of animals in an area including a plurality of grazing paddocks, in which the animals graze, and a milking area, in which the animals are milked, wherein the milking area is accessible from each of the grazing paddocks and each of the grazing paddocks is accessible from the milking area via a sorting gate arrangement, preferably one including a crowd gate arrangement, that is, a movable gate or fence capable of forcing animals to move in a selected direction. According to the method, each of a plurality of animals, which have grazed in the grazing paddocks, is identified and milked in the milking area. A nutritional need and/or a milk production capacity of each of the animals which have been identified and milked is/are established. Finally, each of the animals is automatically guided by means of the sorting gate arrangement, subsequent to the milking of the animal, to enter a selected one of the grazing paddocks depending on the nutritional need and/or the milk production capacity of the animal.

By aid of the present invention, the milk production can be considerably improved. Irrespective of the grazing approach used, e.g. rotational grazing or leader-follower grazing, the present invention provides means for automatically and individually directing animals to grazing paddocks that are most suited to house them; e.g. highly productive animals are directed to grazing paddocks with high nutritional contents and less productive animals are directed to grazing paddocks with less nutritional contents.

In one embodiment, the nutritional need and/or the milk production capacity of each of the animals are/is established by measuring at least one parameter related to the animal or to the milk produced by the animal and by comparing the measured parameter with a reference value.

The parameter may, for each of the animals, be any of a body condition score or other parameter related to the appearance of the animal, a body weight of the animal, or a health parameter for the animal. Alternatively, the parameter is any of a milk yield for the animal, a milk secretion rate for the animal, a milking frequency for the animal, or a quality of milk from the animal, such as e.g. a cell count of the milk, a fat content of the milk, a ratio of a protein content and a fat content of the milk, or the number of days the animal has been in lactation.

The reference value is preferably based on historical data of the measured parameter for the respective animal or for a group of animals.

Hereby, the nutritional need and/or the milk production capacity of each of the animals can be updated dynamically in order to always have data that are up to date.

In another embodiment, the nutritional need and/or the milk production capacity of each of the animals are/is established by means of referring to a database comprising data regarding the nutritional need and/or the milk production capacity of each of the animals. E.g. an animal having larger milk production capacity has typically a higher nutritional need. Such data may have been entered manually or may have been established in other manners than those identified above. Typically, the data is stored in tables.

Typically, the animals can be divided into different groups depending on their nutritional need and/or milk production capacity. Such groups may contain fresh lactation animals, mid lactation animals, late lactation animals, dry animals, and ill animals. Animals of the same group will be directed to the same grazing paddock. Animals may be moved from group to group on an individual basis.

In a further embodiment of the invention, a nutritional content of each of the grazing paddocks is automatically measured, and each of the animals is guided to enter a selected one of the grazing paddocks depending on the measured nutritional contents of the grazing paddocks.

The nutritional contents of the grazing paddocks may be automatically measured by means of measuring any of a quality, a quantity, a biomass, a length, a density, or a grow rate of the grass of the grazing paddocks. The measurements may be performed by an automatic measurement arrangement including any of a NIR instrument, a pasture meter, a capacitance meter, a biomass sensor, or a wet chemistry analyzer device.

This is most advantageous since the nutritional contents of a grazing paddock change quite dramatically with time. Different grasses grow with different speeds and the grow rate depends on the use of fertilizers, the watering, etc.

Alternatively, the processing and control device is provided for automatically calculating a nutritional content of each of the grazing paddocks, wherein each of the animals is guided to enter a selected one of the grazing paddocks depending on the calculated nutritional contents of the grazing paddocks.

In yet a further embodiment of the invention, the utilization of an automatic milking system in the milking area is measured and each of the animals is guided to enter a selected one of the grazing paddocks depending on the measured utilization.

Hereby, animals can be guided to closely located grazing paddocks if the utilization is low and vice versa. It is assumed that animals in closely located grazing paddocks will visit the milking area more often than animals in remotely located grazing paddocks. The guiding of animals depending on the utilization will be made in order to increase the utilization of the automatic milking system and thus the milk production.

The guiding of each of the animals to enter a selected one of the grazing paddocks may alternatively, or additionally, be dependent on distances between the grazing paddocks and the milking area and/or on a forecast weather in the area. Closely located grazing paddocks could be used with priority over more remotely located grazing paddocks. Similarly, the weather in different grazing paddocks may affect the suitability to use the grazing paddocks.

According to a second aspect of the invention an arrangement for animal management is provided, by which the method of the first aspect of the invention can be implemented. The arrangement comprises an animal identification device for identifying; an automatic milking system for milking; means for establishing the nutritional need and/or milk production capacity of each of the animals; and a sorting gate arrangement for automatically guiding each of the animals.

According to a third aspect of the invention, a method is provided for management of animals in an area including a plurality of grazing paddock, in which the animals graze, and a milking area, in which the animals are milked, wherein the milking area is accessible from each of the grazing paddocks and each of the grazing paddocks is accessible from the milking area via a sorting gate arrangement. According to the method, each of a plurality of animals, which have grazed in the grazing paddocks, is identified and milked in the milking area. The time is monitored and each of the animals is automatically guided, subsequent to the milking of the animal, by means of the sorting gate arrangement, to enter a selected one of the grazing paddocks depending on the current time.

By means of this aspect of the invention, sophisticated automatic grazing managements schemes may be applied.

According to a fourth aspect of the invention an arrangement for animal management is provided, by which the method of the third aspect of the invention can be implemented. The arrangement comprises an animal identification device for identifying; an automatic milking system for milking, a clock for monitoring the time, and a sorting gate arrangement for automatically guiding each of the animals.

The present invention provides for pasture based dairy farming wherein the grazed pasture is utilized as efficiently as possible to optimize the profitability from grazed grass. The animals are offered the optimum nutrition in relation to their production status by means of utilizing different grazing systems. The invention offers the user a manner of automating the management of the grazing system.

Further characteristics of the invention, and advantages thereof, will be evident from the detailed description of embodiments of the present invention given hereinafter and the accompanying FIGS. 1-2, which are given by way of illustration only, and thus are not limitative of the present invention.

DETAILED DESCRIPTION OF EMBODIMENTS

Figure 1:
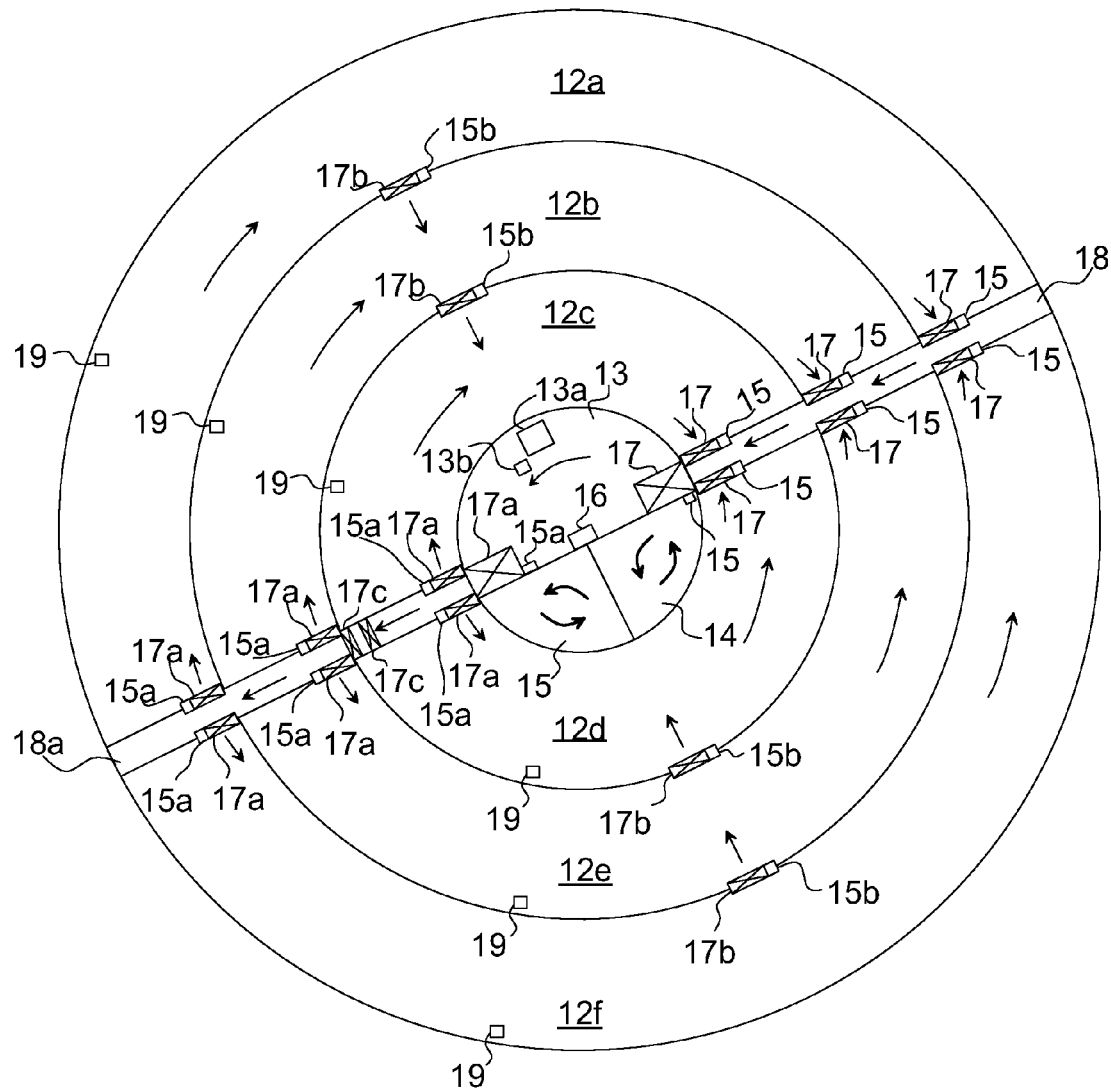
FIG. 1 illustrates schematically an arrangement for housing animals in which an arrangement for animal management in accordance with an embodiment of the invention is implemented.

FIG. 1 illustrates schematically a pasture based animal arrangement 11 for housing animals comprising six enclosed grazing paddocks 12a-f in which the animals are allowed to graze. A passageway 18 is accessible from each of the grazing paddocks 12a-f via a respective automatic gate arrangement 17 and each of the automatic gate arrangements 17 is provided with an animal identification device 15.

The passageway 18 leads to a milking area 13 and an optional waiting or treating area 14 via a further automatic gate arrangement 17 provided with an animal identification device 15 for identification of animals present in front of the automatic gate arrangement 17.

A processing and control device 16 is operatively connected to each animal identification device 15 to receive identifications and is operatively connected to each automatic gate arrangement 17 to control the openings and closings thereof.

Animals can thus be identified at the respective grazing paddock 12a-f before being allowed to enter the passageway 18 and again be identified at the entries to the milking area 13 and the optional waiting or treating area 14. After this second identification each animal can be allowed or guided to enter either the milking area 13 or the waiting area 14.

Animals collected in the optional waiting or treating area 14 can, at any suitable time, be allowed to enter the milking area 13 through the automatic gate arrangement 17 at the entries to the milking area 13 and the optional waiting or treating area 14.

The milking area 13 comprises an automatic milking system 13a and may comprise a waiting pen or area (not illustrated) in front of the automatic milking system 13a such that animals that are allowed to enter the milking area 13 may line up in front of the automatic milking system 13a and enter a milking box of the automatic milking system 13a. It shall be appreciated that the milking area 13 may house several automatic milking systems or at least several milking boxes, in which animals can be milked concurrently.

In one version, the milking system is a rotary milking system provided with at least one milking robot for automatic attachment of teat cups of the rotary milking system to the teats of the animals.

The processing and control device 16 is operatively connected to the automatic milking system 13 in order to control the operation thereof.

The milking area 13 may further house one or several measurement devices 13b provided for measuring at least one animal related parameter of each of the animals milked in the milking area 13, i.e. at least one parameter related to the animal or to the milk produced by the animal.

The parameter(s) may be selected from any of a body condition score or other parameter related to the appearance of the animal, a body weight of the animal, a health parameter for the animal, a milking frequency for the animal, the number of days the animal has been in lactation, a milk yield for the animal, a milk secretion rate for the animal, a quality of milk from the animal, such as e.g. a cell count of the milk, a fat content of the milk, a ratio of a protein content and a fat content of the milk, an urea content of the milk, or a nitrogen content of the milk. EP 1537531 discloses a system for body condition evaluation that can be used in the present invention, the contents of which being hereby incorporated by reference.

The processing and control device 16 is operatively connected to the one or several measurement devices 13*b* to receive measurement data from there.

The processing and control device 16 is further provided to establish a nutritional need and/or a milk production capacity of each of the animals entering the milking area 13. This may be performed by means of comparing the measurement data from the one or several measurement devices 13*b* with reference data.

Alternatively, the nutritional need and/or the milk production capacity of each of the animals are/is established based on historical data of the measured parameter(s) for the animal or for a group of animals including the animal and other animals.

Yet alternatively, the nutritional need and/or the milk production capacity of each of the animals are/is established by means of referring to a database comprising data regarding the nutritional need and/or the milk production capacity of each of the animals stored in e.g. one or several tables.

The milking area 13 leads further to a further passageway 18*a* and to a further optional waiting or treating area 15 via an automatic gate arrangement 17*a* provided with an animal identification device 15*a*. The further passageway 18*a* leads back to the grazing paddocks 12*a-f* via automatic gate arrangements 17*a*, each being provided with an animal identification device 15*a*.

The processing and control device 16 is operatively connected to each of the animal identification devices 15*a* to receive identifications and is operatively connected to each of the automatic gate arrangements 17*a* to control the openings and closings thereof.

Animals can thus be identified at the exit of the milking area 13 and can be allowed or guided to enter either the further passageway 18*a* or the further waiting area 15 depending on different criteria to be detailed later in this description. Animals collected in the further waiting area 15 can at any suitable time be allowed to enter the further passageway 18*a* through the automatic gate arrangement 17*a* at the exit of the milking area 13.

Each animal that enters the further passageway 18*a* is identified at the respective grazing paddocks 12*a-f* and is allowed to enter a selected one of the grazing paddocks 12*a-f* after having been identified. The selected grazing paddock depends, for each of the animals entering the further passageway 18*a*, on the nutritional need and/or the milk production capacity of the animal.

The further passageways 18*a* may be provided with automatic crowd gates 17*c* or similar in order to force the animals to move along the further passageway 18*a*. Alternatively, or additionally, the further passageway 18 may be provided with attractants such as appealing feed and water in order to entice the animals to walk along the further passageway 18*a*.

The automatic gate arrangements 17*a* and the automatic crowd gates 17*c* of FIG. 1 thus constitute a sorting gate arrangement for automatically guiding each of the animals, subsequent to the milking of the animal, to enter a selected one of the grazing paddocks.

It shall be appreciated that other areas may be provided with automatic crowd gates or attractants or similar in order to facilitate the movement of the animals back and fourth between the grazing paddocks 12*a-f* and the milking area 13.

Each of the automatic crowd gates is operatively connected to, and controlled by, the processing and control device 16.

Further, each of the grazing paddocks 12*a-f* may be provided with a respective automatic measurement device or arrangement for automatically measuring a nutritional content of the grazing paddock. The measurement device or arrangement 19 may comprise any of a NIR instrument, a pasture meter, a capacitance meter, a biomass sensor, or a wet chemistry analyzer device, and may be provided for automatically measuring a nutritional content comprises measuring any of a quality, a quantity, a biomass, a length, a density, or a grow rate of the grass of the grazing paddock.

Automatic pasture meters that can be used in the invention include the C-DAX Rapid Pasture Meter from C-Dax Systems Ltd and the Ellinbank Automatic Pasture Reader constructed by Dairy Research Institute (Ellinbank).

The respective measurement device or arrangement 19 is operatively connected to the processing and control device 16 in order to deliver measurement data regarding the nutritional contents of the grazing paddock thereto, and the processing and control device 16 is provided for guiding each of the animals in the passageway 18*a* to enter a selected one of the grazing paddocks 12*a-f* depending on the measured nutritional contents of the grazing paddocks.

Alternatively, the processing and control device 16 may be provided for automatically calculating a nutritional content of each of the grazing paddocks 12*a-f*, wherein each of the animals is guided to enter a selected one of the grazing paddocks 12*a-f* depending on the calculated nutritional contents of the grazing paddocks. The calculation of the nutritional contents of the grazing paddocks may be performed in a variety of manners. Preferably, the calculation is based on any of forecast weathers in the grazing paddocks 12*a-f*, estimated groundwater in the grazing paddocks 12*a-f*, irrigations in the grazing paddocks 12*a-f*, expected uses of fertilizers in the grazing paddocks 12*a-f*, calculated growth rates for the grasses in the grazing paddocks 12*a-f*, and/or calculated consumptions of grasses by animals in the grazing paddocks 12*a-f*.

Yet further, the processing and control device 16 may be provided for measuring the utilization of the automatic milking system 13*a* in the milking area 13, and for guiding each of the animals in the passageway 18*a* to enter a selected one of the grazing paddocks 12*a-f* depending on the measured utilization of the automatic milking system in the milking area 13.

It shall be appreciated that the grazing paddocks 12*a-f* are normally of different sizes and located at different distances from the milking area.

The processing and control device 16 may be provided for holding information regarding distances between the grazing paddocks 12*a-f* and the milking area 13 and/or sizes of grazing paddocks 12*a-f*, and for guiding each of the animals in the passageway 18*a* to enter a selected one of the grazing paddocks 12*a-f* depending on the distances between the grazing paddocks 12*a-f* and the milking area 13 and/or the sizes of the grazing paddocks 12*a-f*. That is, a grazing paddock located close to the milking area 13 may be selected with priority over a more remotely located grazing paddock for an animal having high milk production capacity or for an unhealthy animal such as a limping animal.

Yet further, the processing and control device 16 may be provided for forecasting the weather in the area 11 or receiving a weather forecast for the area 11, and for guiding each of the animals in the passageway 18*a* to enter a selected one of the grazing paddocks 12*a-f* depending on the forecast weather in the area 11. That is, if the local weather is better in some of the grazing paddocks animals may be guided to such paddock with priority over a paddock with a worse weather, e.g. rainy weather where the grass may be more difficult to consume or may be trampled down.

Still further, the processing and control device 16 may be provided for monitoring the time, and for guiding each of the animals in the passageway 18*a* to enter a selected one of the grazing paddocks 12*a-f* depending on the current time.

The area 11 is thus arranged for managing the traffic of animals through the respective grazing paddocks 12*a-f*, gate arrangements 17, 17*a*, and the milking area 13 in accordance with the arrows in FIG. 1. The arrangement of FIG. 1 is preferably arranged for voluntary milking of the animals in the milking area 13. Each of the animals that are to graze is guided to a selected one of the grazing paddocks based on different criteria in order to optimize milk production.

The area 11 may further be provided with automatic gate arrangements 17*b*, each being provided with an animal identification device 15*b*, in order to allow animals to move between adjacent grazing paddocks after having been identified. In such instance, the processing and control device 16 is operatively connected to each of the animal identification devices 15*b* to receive identifications and is operatively connected to each of the automatic gate arrangements 17*b* to control the openings and closings thereof. The allowance for moving from one grazing paddock to another may be made dependent on any of the criteria specified above.

According to a further embodiment of the invention an arrangement for management of animals in the area 11 comprises a clock provided for monitoring the time, and a sorting gate arrangement 17*a*, 17*c* provided for automatically guiding each of the animals, subsequent to the milking of the animal, to enter a selected one of the grazing paddocks depending on the current time. The processing and control device 16 may further be arranged to automatically calculate a future expected nutritional content of each of the grazing paddocks, wherein each of the animals is guided to enter a selected one of the grazing paddocks depending on the calculated future expected nutritional contents of the grazing paddocks. The calculation of the future expected nutritional contents of the grazing paddocks may be made as disclosed above.

Figure 2:
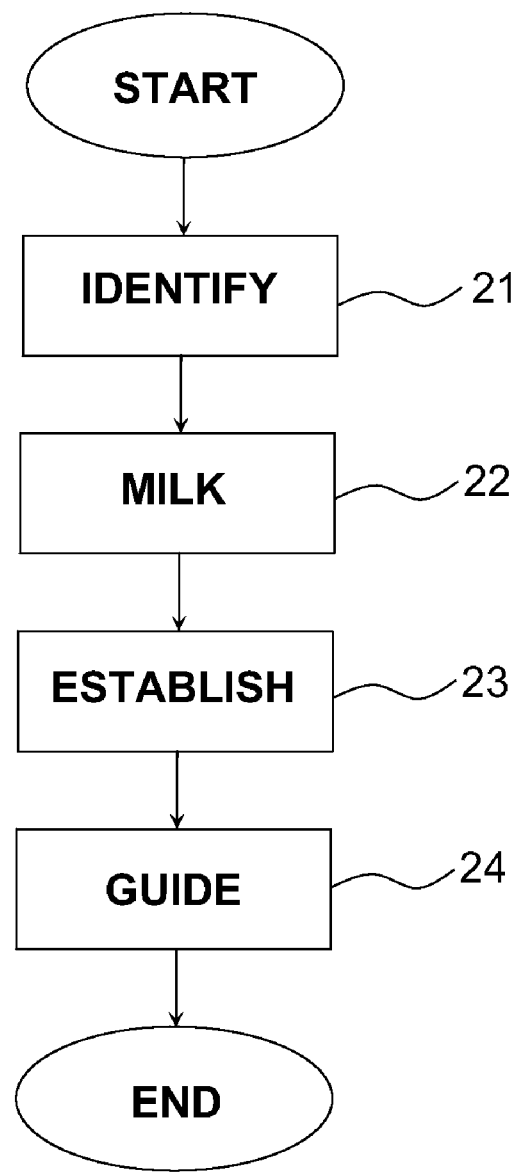
FIG. 2 is a flow scheme of a method for animal management in accordance with an embodiment of the invention.

A method for animal management will next be described with reference to the flow scheme of FIG. 2 and the arrangement of FIG. 1 when applicable.

The method starts by identifying, in a step 21, an animal that is to visit the milking area 13. Next, the animal is, in a step 22, milked in the automatic milking system 13*a* of the milking area 13. A nutritional need and/or a milk production capacity of the animal being milked are/is, in a step 23, established. After milking of the animal has terminated, the animal is, in a step 24, automatically guided by means of the sorting gate arrangement 17*a*, 17*c* to enter a selected one of the grazing paddocks 12*a-f* depending on the nutritional need and/or the milk production capacity of the animal. The method is performed repeatedly for each animal visiting the milking area 13.

It shall be appreciated that the grazing paddocks of the area 11 may be of a much higher number, may be of different shapes, and may be located in different patterns. Further, the gate arrangements, the milking area, and the optional waiting or treating areas may be located and designed differently. The gates may be so-called smart gates, one-way gates, telemetry gates, and/or automatic time activated gates.

The scope of protection of the present invention is given in the following claims.

The invention claimed is:

1. A method for management of animals, wherein the method comprising the steps of: providing an area (11) including; a plurality of grazing paddocks (12*a-f*), in which the animals are allowed to graze, and a milking area (13) with an automatic milking system (13*a*), in which the animals are milked, wherein the milking area is accessible from each of the grazing paddocks and each of the grazing paddocks is accessible from the milking area via a sorting gate arrangement (17*a*, 17*c*);

identifying and milking, in said milking area, each of a plurality of animals which have grazed in the grazing paddocks;

monitoring a current time during the milking of each animal;

based on a measurement made during milking, establishing a nutritional need of each of the animals being milked;

based on another measurement made during milking, establishing a milk production capacity of each of the animals being milked;

selecting a grazing paddock for each animal having been milked and leaving the milking area, said selection being made to increase overall milking production of the milking system and being based on i) the monitored current time during the milking of the animal, and ii) a nutritional content of each of the grazing paddocks, the selected grazing paddock depending on said nutritional contents of the grazing paddocks; and automatically guiding, via the sorting gate arrangement, each animal leaving the milking area to enter the selected grazing paddock.

2. The method of claim 1, wherein the monitored current time during milking is a current time at the completion of the milking of each animal.

3. The method of claim 1, wherein said nutritional content of each grazing paddock is based on forecast weathers in said grazing paddocks, estimated groundwater in said grazing paddocks, irrigations in said grazing paddocks, expected uses of fertilizers in said grazing paddocks, calculated growth rates for the grasses in said grazing paddocks, and calculated consumption of grasses by animals in said grazing paddocks.

4. The method of claim 1, wherein said nutritional content of each grazing paddock is based on at least one of forecast weathers in said grazing paddocks, estimated groundwater in said grazing paddocks, irrigations in said grazing paddocks, expected uses of fertilizers in said grazing paddocks, calculated growth rates for the grasses in said grazing paddocks, and calculated consumption of grasses by animals in said grazing paddocks.

5. The method of claim 1, wherein, said step of establishing a nutritional need of each of the animals being milked comprises measuring at least one parameter related to at least one of i) the animal, and ii) the milk produced by the animal, and comparing said measured parameter with a reference value, and in said selection step, the selected grazing paddock depends on said comparison of said measured parameter with the reference value.

6. The method of claim 5, wherein, for each of the animals, said measured parameter is at least one of a body condition score, a parameter related to appearance of the animal, a body weight of the animal, a health parameter for the animal, a milking frequency for the animal, and a number of days the animal has been in lactation.

7. The method of claim 5, wherein, for each of the animals, said parameter is at least one of a milk yield for the animal, a milk secretion rate for the animal, a quality of milk from the animal, a cell count of the milk, a fat content of the milk, a ratio of a protein content over a fat content of the milk, an urea content of the milk, and a nitrogen content of the milk.

8. The method of claim 5, wherein, for each of the animals, said reference value is based on historical data of the measured parameter for that animal or for a group of animals.

9. The method of claim 1, wherein one of the step of establishing the nutritional need and the step of establishing the milk production capacity of each of the animals, is established by referring to a database comprising data regarding one of the nutritional need and the milk production capacity of each of the animals.

10. The method of claims 1, comprising the further step of:
automatically measuring a nutritional content of each of the grazing paddocks,
wherein said step of selecting the grazing paddock further depends on said measured nutritional contents of the grazing paddocks.

11. The method of claim 10, wherein, for each of the grazing paddocks, the step of automatically measuring a nutritional content comprises measuring at least one of a quality, a quantity, a biomass, a length, a density, and a grow rate of the grass of the grazing paddock.

12. The method of claim 10, wherein, for each of the grazing paddocks, the step of automatically measuring a nutritional content is performed by any at least one of a NIR instrument, a pasture meter, a capacitance meter, a biomass sensor, and a wet chemistry analyzer device.

13. The method of claim 1, comprising the further step of:
measuring the utilization of the automatic milking system in the milking area, and
wherein said step of selecting the grazing paddock further depends on said measured utilization of the automatic milking system.

14. The method of claim 1, comprising the further step of:
holding information regarding distances between the grazing paddocks and the milking area, and
wherein said step of selecting the grazing paddock further depends on the held distances between the grazing paddocks and the milking area.

15. The method of claim 1, comprising the further step of:
forecasting the weather in said area, and
wherein said step of selecting the grazing paddock further depends on the forecast weather in said area.

16. The method of claim 1, wherein each of the steps of monitoring the current time, establishing the nutritional need, establishing the milk production capacity, selecting the grazing paddock, and automatically guiding, is performed for each of the animals being milked.

17. The method of claim 1, wherein said step of guiding is performed by a sorting gate arrangement including a crowd gate arrangement.

18. The method of claim 1, wherein,
said step of establishing a milk production of each of the animals being milked comprises
measuring at least one parameter related to the milk produced by the animal, and
comparing said measured parameter with a reference value, and
in said selection step, the selected grazing paddock depends on said comparison of said measured parameter with the reference value.

19. An arrangement for performing the method of claim 1, further comprising:
an animal identification device provided for identifying, in said milking area, each of a plurality of animals which have grazed in the grazing paddocks;
an automatic milking system provided for milking each of said plurality of animals which have been identified;
means provided for monitoring the time; and
a sorting gate arrangement (17a, 17c) provided for automatically guiding (24) each of the animals, subsequent to the milking of the animal, to enter the selected one of the grazing paddocks.

20. The arrangement of claim 19, wherein the automatic milking system includes a milking robot for automatic attachment of teat cups of the milking station to the teats of the animals.

21. The arrangement of claims 19, wherein,
the milking area comprising a rotary milking system comprising a milking robot for automatic attachment of teat cups of the milking station to the teats of the animals.

22. The method of claim 1, wherein,
said step of establishing a nutritional need of each of the animals being milked comprises
measuring at least one parameter related to at least one of i) the animal, and ii) the milk produced by the animal, and
comparing said measured parameter with a reference value, and
in said selection step, the selected grazing paddock depends on said comparison of said measured parameter with the reference value, and
highly productive animals are directed to grazing paddocks with high nutritional contents and less productive animals are directed to grazing paddocks with less nutritional contents.

23. The method of claim 1, comprising the further step of:
forecasting the weather in said area, and
wherein said step of selecting the grazing paddock further depends on the forecast weather in said area so that the animal is directed to a grazing paddock where the weather is forecast to be better for grazing.

24. A method for management of animals in an area (11) including a plurality of grazing paddocks (12a-f), in which the animals are allowed to graze, and a milking area (13) with an automatic milking system (13a), in which the animals are milked, wherein the milking area is accessible from each of the grazing paddocks and each of the grazing paddocks is accessible from the milking area via a sorting gate arrangement (17a, 17c), the method comprising the steps of:
identifying and milking, in said milking area, each of a plurality of animals which have grazed in the grazing paddocks;
establishing at least one of a nutritional need of each of the animals being milked and a milk production capacity of each of the animals being milked, the one of the established nutritional need and the established milk production capacity being an available factor for determining a grazing paddock for each animals having been milked;
selecting a grazing paddock for each animal having been milked and leaving the milking area, said selection being made to increase overall milking production of the milking system and being based on i) a current time during the milking of the animal, and ii) a nutritional condition of the selected grazing paddock; and automatically guiding, via the sorting gate arrangement, each animal leaving the milking area to enter the selected grazing paddock.

25. A method for management of animals in an area (11) including a plurality of grazing paddocks (12*a-f*), in which the animals are allowed to graze, and a milking area (13) with an automatic milking system (13*a*), in which the animals are milked, wherein the milking area is accessible from each of the grazing paddocks and each of the grazing paddocks is accessible from the milking area via a sorting gate arrangement (17*a*, 17*c*), the method comprising the steps of:

identifying and milking, in said milking area, each of a plurality of animals which have grazed in the grazing paddocks;

monitoring a current time;

selecting a grazing paddock for each animal having been milked and leaving the milking area, said selection being made to increase overall milking production of the milking system and being based on i) the monitored current time, and ii) a nutritional condition of the selected grazing paddock; and automatically guiding, via the sorting gate arrangement, each animal leaving the milking area to enter the selected grazing paddock.

\* \* \* \* \*